(12) United States Patent
Sakai et al.

(10) Patent No.: US 8,040,220 B2
(45) Date of Patent: Oct. 18, 2011

(54) METHOD AND APPARATUS FOR MANAGING TAG INFORMATION, AND COMPUTER PRODUCT

(75) Inventors: Atsushi Sakai, Kawasaki (JP); Takayuki Hasebe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1236 days.

(21) Appl. No.: 11/442,987

(22) Filed: May 31, 2006

(65) Prior Publication Data

US 2007/0176750 A1 Aug. 2, 2007

(30) Foreign Application Priority Data

Jan. 18, 2006 (JP) .................................. 2006-010478

(51) Int. Cl.
*H04Q 5/22* (2006.01)
(52) U.S. Cl. .................. 340/10.1; 340/10.51; 340/572.1
(58) Field of Classification Search ................ 340/10.51, 340/10.1, 10.4, 10.42, 572.1, 572.4
See application file for complete search history.

(56) References Cited

U.S. PATENT DOCUMENTS

| | | | | |
|---|---|---|---|---|
| 6,101,477 | A | * | 8/2000 | Hohle et al. ...................... 705/5 |
| 6,747,546 | B1 | * | 6/2004 | Hikita et al. ............... 340/10.31 |
| 2003/0006878 | A1 | * | 1/2003 | Chung ......................... 340/5.25 |
| 2004/0049451 | A1 | * | 3/2004 | Berardi et al. ................. 705/39 |
| 2005/0099292 | A1 | * | 5/2005 | Sajkowsky ............... 340/539.13 |

FOREIGN PATENT DOCUMENTS

| | | |
|---|---|---|
| JP | 2002-337827 | 11/2002 |
| JP | 2005-77354 A | 3/2005 |
| JP | 2005-109652 A | 4/2005 |
| JP | 2005-258871 A | 9/2005 |

OTHER PUBLICATIONS

Japanese Office Action, Partial English-language Translation, mailed May 10, 2011 for corresponding Japanese Application No. 2006-010478.

* cited by examiner

*Primary Examiner* — Edwin Holloway, III
(74) *Attorney, Agent, or Firm* — Fujitsu Patent Center

(57) ABSTRACT

A storing unit stores a plurality of pieces of tag information to be stored in a single radio-frequency-identification tag. A responding unit transmits, in response to a request from a reader/writer, part of the stored tag information to the reader/writer.

6 Claims, 8 Drawing Sheets

| COMPANY ID | TAG INFORMATION | FLAG |
|---|---|---|
| H | TAG INFORMATION HH | PHYSICAL |
| K | TAG INFORMATION KK | VIRTUAL |
| L | TAG INFORMATION LL | VIRTUAL |
| M | TAG INFORMATION MM | VIRTUAL |

FIG.6

| COMPANY ID | ACCESS STATUS | TRANSMISSION SPEED | TAG INFORMATION | FLAG |
|---|---|---|---|---|
| H | ONLINE | 100 Mbps | TAG INFORMATION HH | PHYSICAL |
| K | OFFLINE | - | TAG INFORMATION KK | VIRTUAL |
| L | ONLINE | 64 Kbps | TAG INFORMATION LL | VIRTUAL |

FIG.7

| COMPANY ID | COMPANY ID |
|---|---|
| H | K, L, M |
| U | V |
| ⋮ | ⋮ |

METHOD AND APPARATUS FOR MANAGING TAG INFORMATION, AND COMPUTER PRODUCT

BACKGROUND OF THE INVENTION

1. Field of the Invention

The present invention relates to a technology for managing tag information to be stored in a radio-frequency-identification (RFID) tag.

2. Description of the Related Art

Recently, RFID tags have been employed in various fields. Japanese Patent Application Laid-Open No. 2002-337827, for example, disclose affixing an RFID tag to a mail-delivery order to of a mail (or parcels) and tracing the mail based on information in the RFID tag.

In some cases only a tag ID used for identifying an RFID tag is stored in the RFID tag, while in other cases the tag ID and tag information are stored in the RFID tag.

FIG. 9 is a schematic for explaining one example of a conventional art. In this conventional art, a tag ID and tag information are stored in association in a tag server for a plurality of RFID tags, and only a tag ID is stored in each RFID tag. Only one tag information is associated with one tag ID. When a reader/writer reads a tag ID from an RFID tag and transmits the read tag ID to the tag server, the tag server retrieves tag information corresponding to the received tag ID and transmits the retrieved tag information to the reader/writer. However, there are problems that the tag server needs to be prepared and the reader/writer needs to have online access to the tag server when using the RFID tag.

FIG. 10 is a schematic for explaining another example of a conventional technology in which a tag ID and tag information are stored in each RFID tag, and a reader/writer reads tag information directly from the RFID tag. However, a substantial amount of memory needs to be prepared in the RFID tag for storing the tag information so that an RFID tag becomes rather expensive.

SUMMARY OF THE INVENTION

It is an object of the present invention to at least partially solve the problems in the conventional technology.

An apparatus according to one aspect of the present invention is for managing tag information to be stored in a radio-frequency-identification tag. The apparatus includes a storing unit that stores a plurality of pieces of tag information to be stored in a single radio-frequency-identification tag; and a responding unit that transmits, in response to a request from a reader/writer, part of the stored tag information to the reader/writer.

A method according to another aspect of the present invention is for managing tag information to be stored in a radio-frequency-identification tag. The method includes registering a plurality of pieces of tag information to be stored in a single radio-frequency-identification tag as tag management information; and transmitting, in response to a request from a reader/writer, part of the stored tag information to the reader/writer.

A computer-readable recording medium according to still another aspect of the present invention stores a computer program for managing tag information to be stored in a radio-frequency-identification tag. The computer program causes a computer to execute registering a plurality of pieces of tag information to be stored in a single radio-frequency-identification tag as tag management information; and transmitting, in response to a request from a reader/writer, part of the stored tag information to the reader/writer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is another example of contents of a tag management table;

FIG. 7 is an example of contents of a route table;

DETAILED DESCRIPTION OF THE PREFERRED EMBODIMENTS

Exemplary embodiments of the present invention are explained below in detail with reference to the accompanying drawings.

Figure 1:
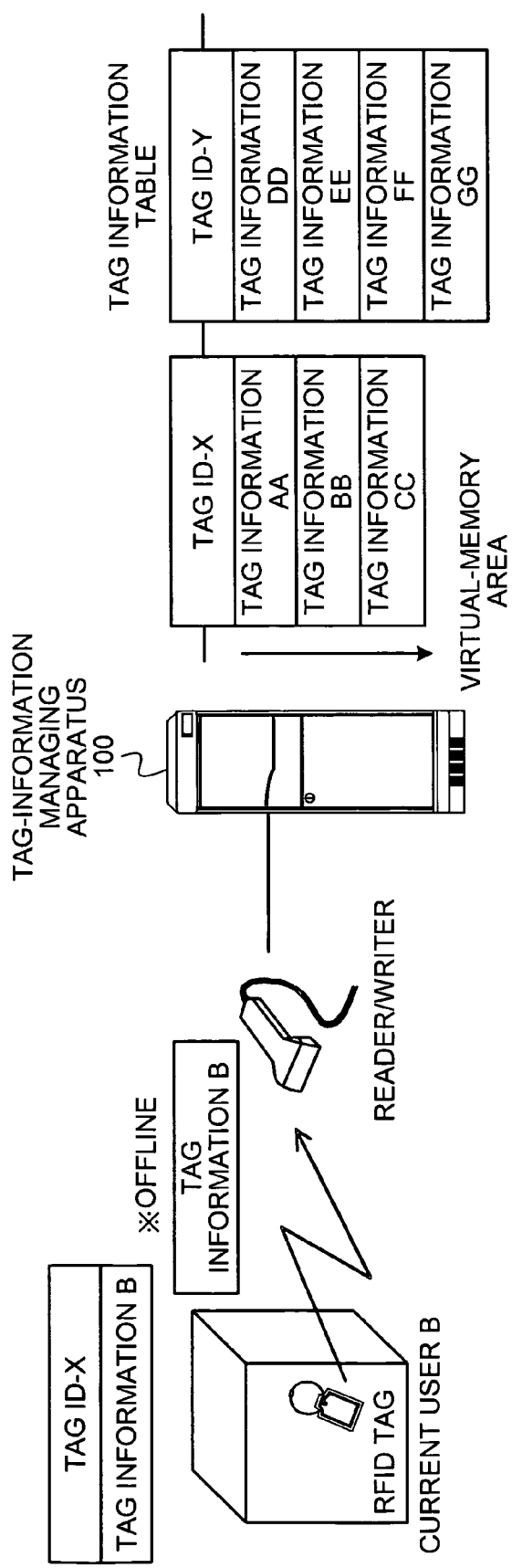
FIG. 1 is a schematic for explaining the concept of an RFID system according to an embodiment of the present invention.

FIG. 1 is a schematic for explaining a concept of an RFID system according to an embodiment of the present invention. The RFID system includes a tag-information managing apparatus 100 that manages a plurality of pieces of tag information corresponding to each of a plurality of tag IDs, and each of a plurality of RFID tags stores therein a tag ID and tag information. Namely, if each piece of tag information is made to represent tag information of a different user, one RFID tag can be shared by those different users.

For example, if an RFID tag with a tag ID-X is to be used by three users A, B, and C, the tag-information managing apparatus 100 manages three pieces of tag information therein: tag information AA for the user A, tag information BB for the user B, and tag information CC for the user C, all of which correspond to the tag ID-X. Similarly, if an RFID tag with a tag ID-Y is to be used by four users D, E, F, and G, the tag-information managing apparatus 100 manages four pieces of tag information therein: tag information DD for the user D, tag information EE for the user E, tag information FF for the user F, and tag information GG for the user G, all of which correspond to the tag ID-Y.

At a certain time point, each RFID tag stores therein one tag ID and one piece of tag information. Namely, the RFID tag is used, at the certain point, by a specific user from among the users that can use the RFID tag. For example, when tag information AA is present in the RFID tag with the tag ID-X, the RFID tag can be used by the user A. When tag information BB is present in the RFID tag with the tag ID-X, the RFID tag can be used by the user B, and when tag information CC is present in the RFID tag, the RFID tag can be used by the user C. The tag information to be stored in an RFID tag at a certain point in time is transmitted from the tag-information managing apparatus 100 to a reader-writer, and the reader-writer writes the tag information in the RFID tag.

The area in which the tag information is stored in the tag-information managing apparatus 100 is referred to as a virtual memory area, while the area in which the tag information is stored in the RFID tag is referred to as a physical memory area. In a general computer, a virtual memory area is used to store software, etc. that cannot be stored in a physical memory area due to inadequate capacity of the physical memory area, and based on software-execution information, memory management software determines whether to use the physical or virtual memory area. On the contrary, in the RFID system, the virtual memory area is used for storing data which cannot be stored in the physical memory area of the RFID tag. The virtual memory area also serves as a cache memory area when sufficient bandwidth cannot be ensured for a communication line to the RFID tag and can be ensured for that to a hard disk in the server (tag-information managing apparatus 100). A semiconductor memory in the tag and memory of the hard disk in the server are allocated based on tag information such as user information, tag location, and destination information.

According to the present embodiment, a plurality of users shares a single RFID tag. Precisely, the tag-information managing apparatus 100 manages tag corresponding to a plurality of users and stores tag information corresponding to one user in the RFID tag at a certain time point. Thus, the physical memory area of the RFID tag can be effectively used, resulting in lower cost per user to use the RFID tag.

Figures 2, 3:
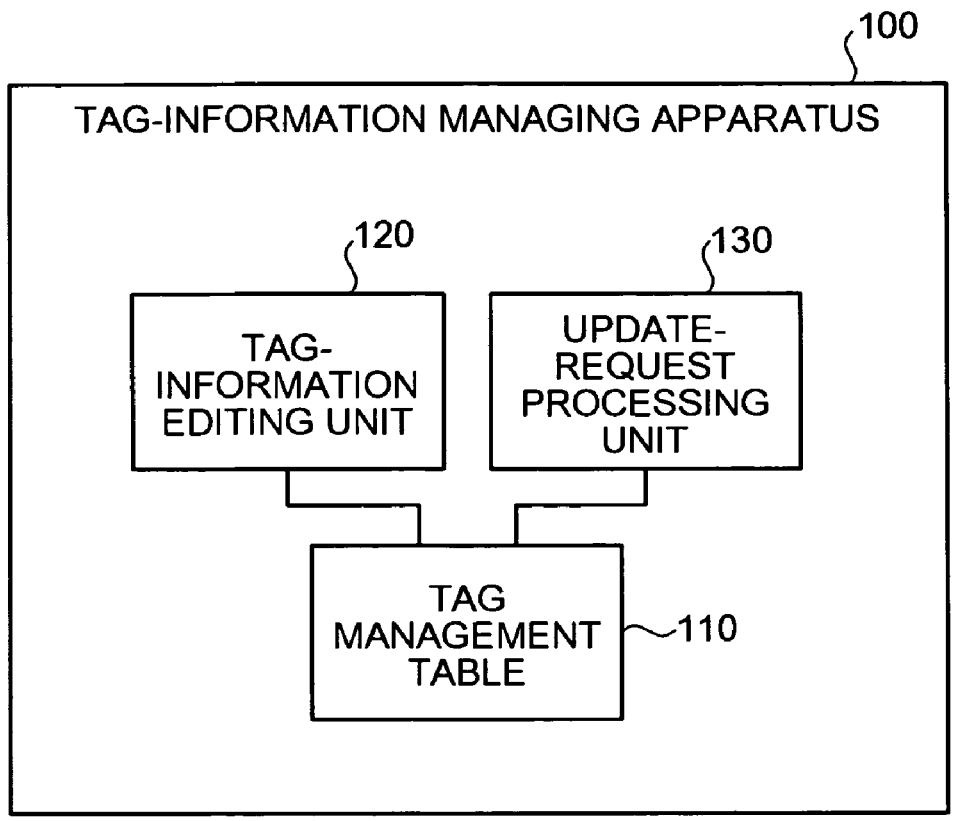
FIG. 2 is a detailed functional block diagram for explaining a structure of a tag-information managing apparatus shown in FIG. 1.
FIG. 3 is an example of contents of a tag management table shown in FIG. 2.

FIG. 2 is a detailed functional block diagram of the tag-information managing apparatus 100. The tag-information managing apparatus 100 includes a tag management table 110, a tag-information editing unit 120, and an update-request processing unit 130.

The tag management table 110 stores, with respect to each RFID tag, tag information corresponding to users who share the RFID tag. FIG. 3 is an example of contents of the tag management table 110. The tag management table 110 contains, with respect to each RFID tag, a company ID, tag information, and a flag for each of companies that share the same RFID tag. The company ID identifies each company. The flag indicates whether the tag information is stored in the physical memory area or in the virtual memory area. In FIG. 3, it is indicated that a company with company ID H is using the RFID tag, the RFID tag is storing tag information HH, and the flag is physical meaning that the tag information HH is stored in the physical memory area. Moreover, companies with company IDs E, F, and G with tag information EE, FF, and GG, respectively, can use the same RFID tag.

Figure 4:
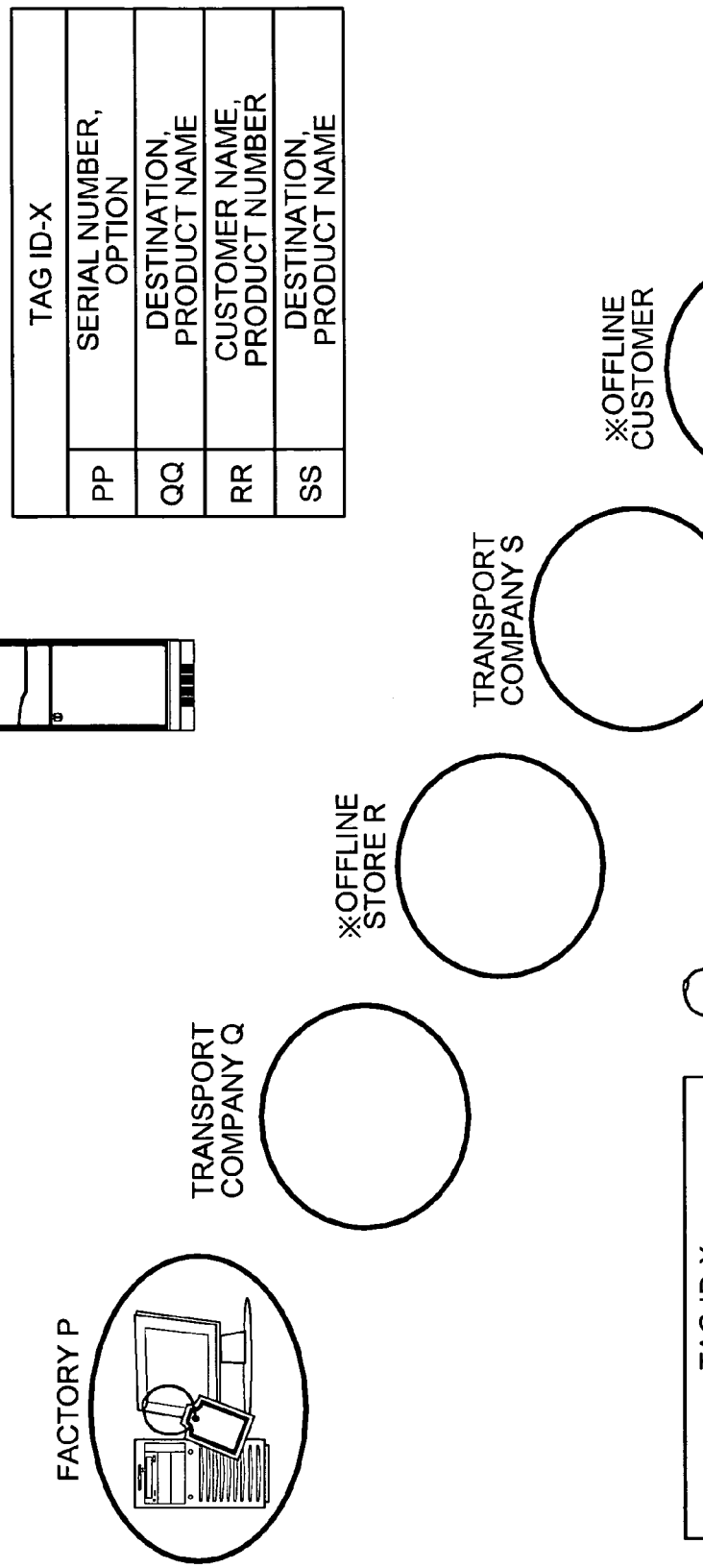
FIG. 4 is a schematic for explaining a situation where tag information is managed using the tag management table shown in FIG. 3.

FIG. 4 is a schematic for explaining a situation where the tag information is managed based on the tag management table 110. In this situation, the RFID tag is shared by five users: a factory P, a transport company Q, a store R, a transport company S, and a customer. The RFID tag stores a serial number, options, and the like as the tag information PP when the RFID tag is used by the factory P, stores a destination information, a product name, and the like as the tag information QQ when the RFID tag is used by the transport company Q, stores a customer name, a product number, and the like as the tag information RR when the RFID tag is used by the store R, and stores another destination information, a product name, and the like as the tag information SS when the RFID tag is used by the transport company S.

It is assumed here that the store R and the customer do not have an online access to the tag-information managing apparatus 100. Namely, when a product to which the RFID tag is attached is shipped from the factory P to the transport company Q, the tag information PP of the factory P is updated with the tag information QQ of the transport company Q, and when the product is delivered to the store R by the transport company Q, the tag information QQ is updated with the tag information RR of the company R.

Subsequently, when the product is shipped from the store R to the customer by the transport company S, the tag information RR is updated with the tag information SS of the transport company S, and when the product is delivered to the customer by the transport company S, the tag information SS is updated with the tag information used by the customer.

Returning to the explanation of FIG. 2, the tag-information editing unit 120 edits information stored in the tag management table 110. More specifically, the tag-information editing unit 120 associates the company ID with the tag information to register the tag information in the tag management table 110, and also updates the tag information stored in the tag management table 110.

The update-request processing unit 130 transmits the tag information to the reader/writer (see FIG. 1) in response to an update-request from the reader/writer. The update-request is a request for retrieving new information to be written, corresponding to the tag ID and the company ID, to update the tag information stored in the RFID tag.

The update-request processing unit 130 retrieves tag information corresponding to the tag ID and the company ID specified by the reader/writer from the tag management table 110 and returns the retrieved tag information to the reader/writer. The reader/writer receives the tag information from the update-request processing unit 130 and writes the tag information into the RFID tag.

Due to the operation of the update-request processing unit 130, when a new user starts using the RFID tag, the reader/writer can update the existing tag information with the tag information corresponding to the new user.

Figure 5:
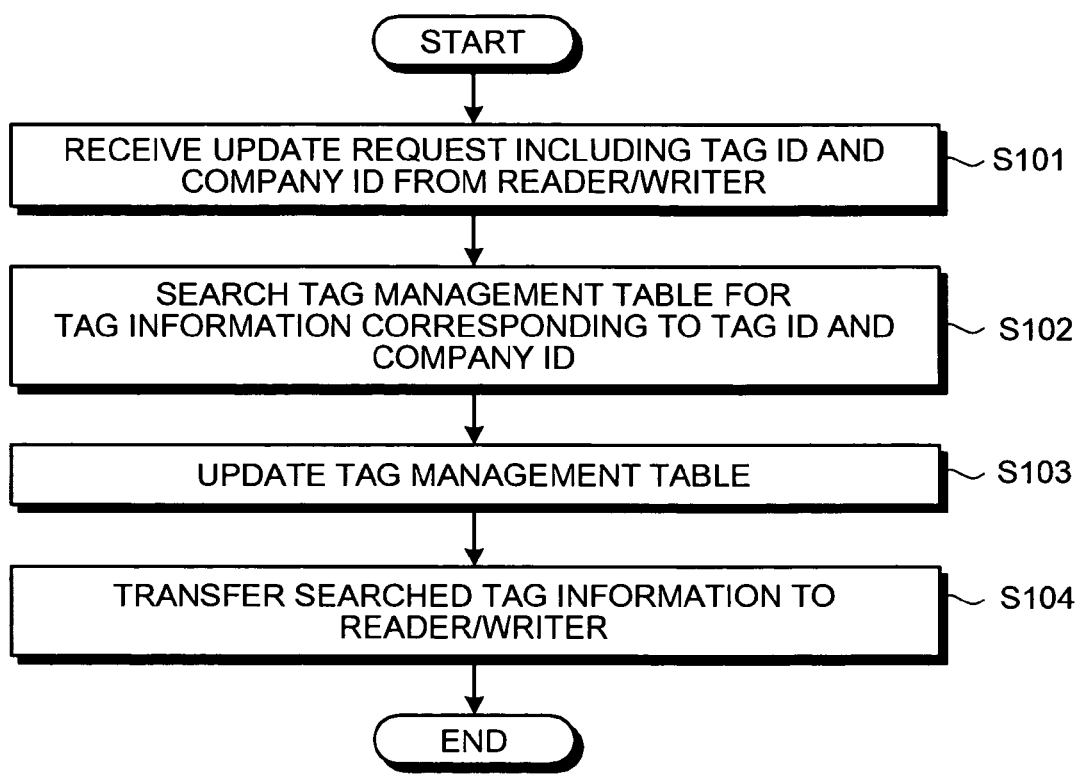
FIG. 5 is a flowchart for explaining a process performed by an update-request processing unit shown in FIG. 2.

FIG. 5 is a flowchart for explaining a process performed by the update-request processing unit 130. At step S101, the update-request processing unit 130 receives an update request from the reader/writer that includes a tag ID and a company ID.

At step S102, the update-request processing unit 130 searches the tag management table 110 for tag information corresponding to the tag ID and the company ID specified in the update-request. At step S103, the update-request processing unit 130 updates hit tag information in the tag management table 110 to indicate that the hit tag information is stored in the physical memory area. At step S104, the update-request processing unit 130 transmits the hit tag information to the reader/writer. Thus, when a new user starts using the RFID tag, the reader/writer can obtain tag information corresponding to the new user and update the existing tag information with the obtained tag information.

As described above, according to the present embodiment, the tag management table 110 stores tag information corresponding to a plurality of companies with respect to each RFID tag, and the update-request processing unit 130 retrieves, from the tag management table 110, the tag information corresponding to a tag ID and a company specified in response to the update-request from the reader/writer and transmits the retrieved tag information to the reader/writer, so that the reader/writer can update the tag information existing in the RFID tag when a user is changed. As a result, one RFID tag is effectively used by a plurality of users and a cost per user to use the RFID tag can be reduced.

Although it is explained that the reader/writer specifies the company ID and sends the update-request to the update-request processing unit 130, the present invention is not limited to the above embodiment. It is possible employ a configuration that the tag management table 110 stores a sequential order of the tag information to be updated, the reader/writer sends the update-request without specifying the company ID, and the update-request processing unit 130 transmits the hit tag information by referring to the sequential order stored in the tag management table 110 to the reader/writer.

Furthermore, when the tag information of the RFID tag is updated, although it is explained in the present embodiment that the tag information corresponding only to a new user is transmitted from the tag-information managing apparatus 100, it is possible to employ a configuration that the RFID tag includes an area for storing tag information corresponding to a plurality of users and the tag-information managing apparatus 100 transmits the tag information in response to the update-request from the reader/writer, so that the reader/writer can write a plurality of pieces of tag information corresponding to a plurality of users into the RFID tag at one time.

For example, if there is a series of users who do not have online accesses to the tag-information managing apparatus 100, and when the tag-information managing apparatus 100 becomes accessible online, it is necessary to write the necessary tag information corresponding to the users to the RFID tag at one time. Namely, it is necessary to prepare a memory area in the RFID tag for storing a plurality of tag information corresponding to the users to write the tag information into the RFID tag at one time.

In this case, it becomes possible to write a plurality of tag information into the RFID tag at one time by using the tag management table 110 that stores the tag information with respect to each RFID tag shown in FIG. 6.

The tag management table 110 stores, with respect to each RFID tag, information corresponding to companies which share the RFID tag and including, for example, a company ID, access status, transmission speed, tag information, and a flag to indicate whether the tag information is stored in the physical memory area or in the virtual memory area. The access status indicates whether a company which uses the RFID tag has an online access to the tag-information managing apparatus 100. The transmission speed indicates a transmission speed between the tag-information managing apparatus 100 and the reader/writer used when the company has an online access to the tag-information managing apparatus 100.

By using the tag management table 110, if there is a series of factories which access status are both offline, and when the tag-information managing apparatus 100 becomes accessible online, the update-request processing unit 130 can transmit all the necessary tag information corresponding to the companies at one time and the reader/writer can write the tag information received from the update-request processing unit 130 into the RFID tag. Even when access status is online, if a transmission speed is lower than the predetermined speed, it takes time to transmit the tag information so that the update-request processing unit 130 determines that the access status is offline. Then, when the access status becomes accessible online, the update-request processing unit 130 transmits a plurality of pieces of the tag information to the reader/writer and the reader/writer writes the tag information into the RFID tag.

By storing the access status and the transmission speed corresponding to the companies in the tag management table 110, the tag-information managing apparatus 100 can respond to an update-request from the reader/writer and can transmit in bulk a plurality of pieces of tag information in response to the update-request.

Alternative to the tag management table 110 that stores the tag information shown in FIG. 6, it is possible to combine a route table, which determines when and which the tag information is retrieved, with the tag management table 110 that stores the tag information shown in FIG. 3, so that the tag-information managing apparatus 100 can transmit a plurality of pieces of tag information at one time to the reader/writer.

FIG. 7 is an example of contents of the route table. The route table stores a company ID and retrievable tag information corresponding to a timing at which the tag information is retrieved. Namely, it is determined in the route table that if tag information for a company H is retrieved, not only the tag information HH for the company H but also a plurality of pieces of tag information KK, LL, and MM for companies K, L, and M are retrieved and the above retrieved tag information is transmitted in bulk to the reader/writer.

Thus, by combining the route table with the tag management table 110, it becomes possible to transmit a plurality of pieces of tag information to the reader/writer.

Although it is explained in the present embodiment that the RFID tag is shared with the users, the present invention is not limited to the above embodiment. Depending on a product to which an RFID tag is attached or a situation in which the product is used, it is possible for a single user to use an RFID tag and rewrite the tag information if needed.

For example, because the RFID tag is mass-produced, it can happen that the memory area of the RFID tag is not large enough for storing the tag information when amount of tag information increases. In this case, a plurality of pieces of tag information can be stored in the tag-information managing apparatus 100 and a necessary part of the tag information can be retrieved by a user when the user needs to update the tag information of the RFID tag.

Although the tag-information managing apparatus 100 is explained in the present embodiment, it is possible to employ a tag-information managing program by realizing software that has the same configuration of the tag-information managing apparatus 100.

Figure 8:
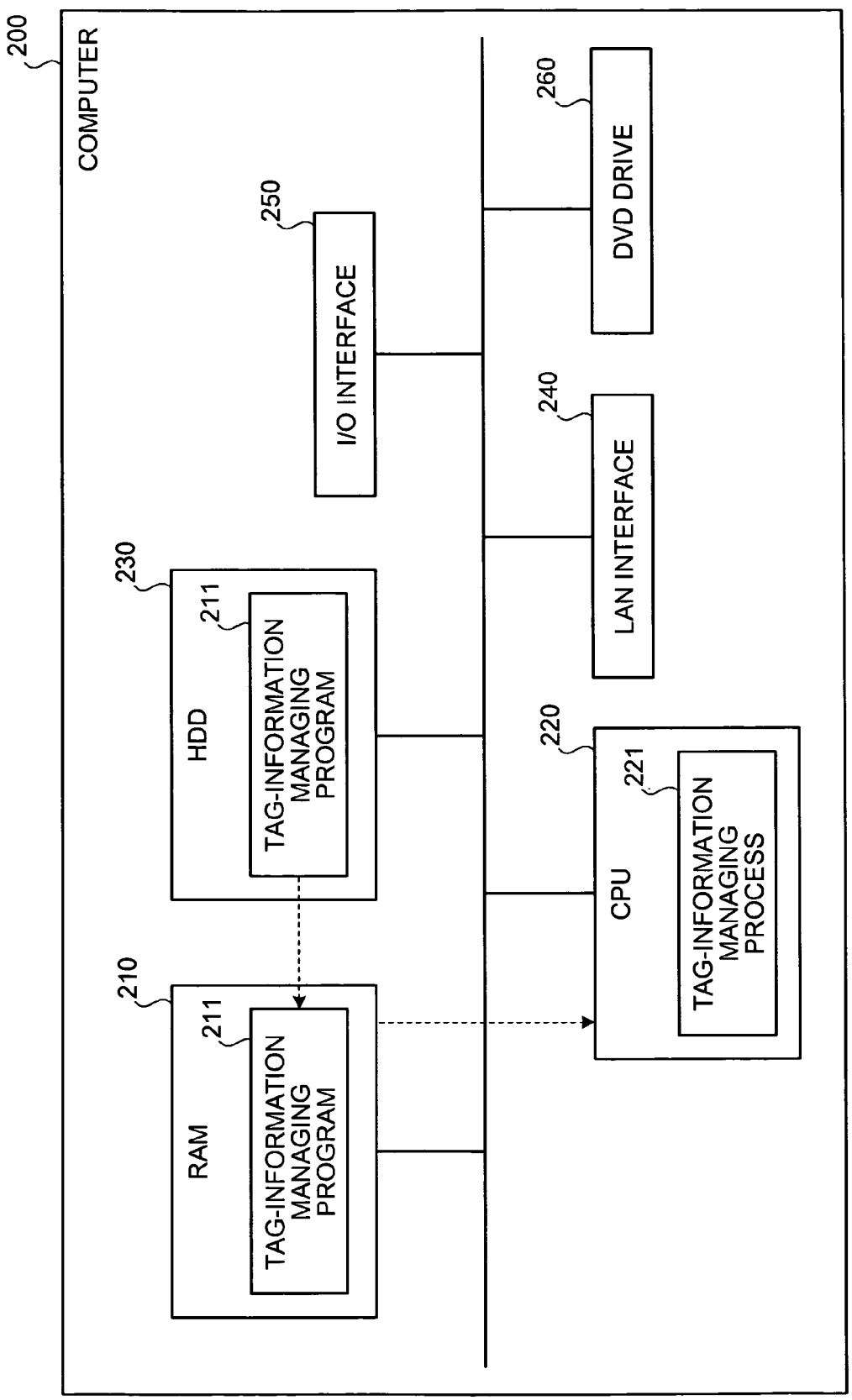
FIG. 8 is a detailed functional block diagram of a computer that executes tag-information managing program according to the present embodiment.
Figure 9:
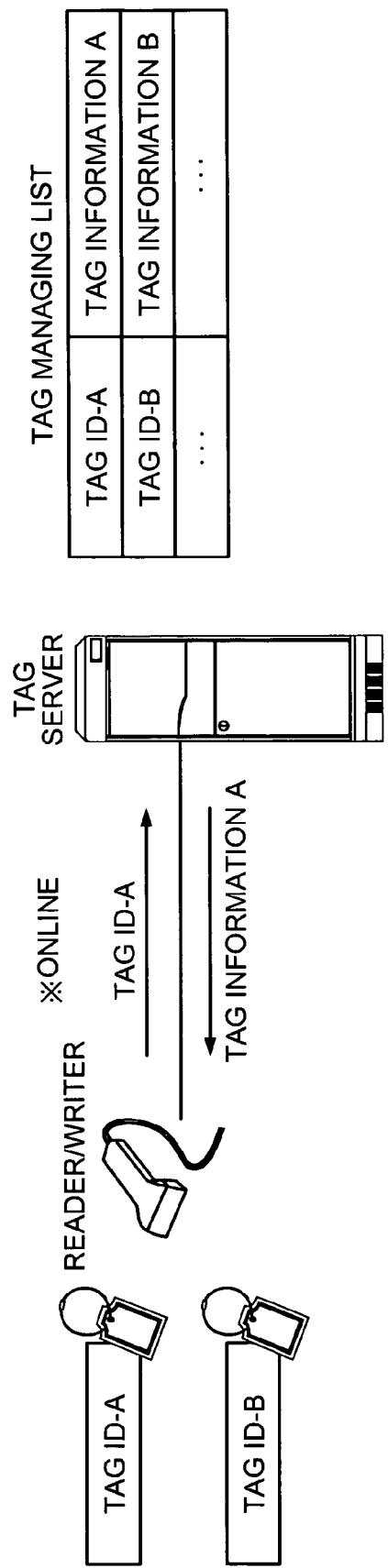
FIG. 9 is a schematic for explaining one example of a conventional art.
Figure 10:
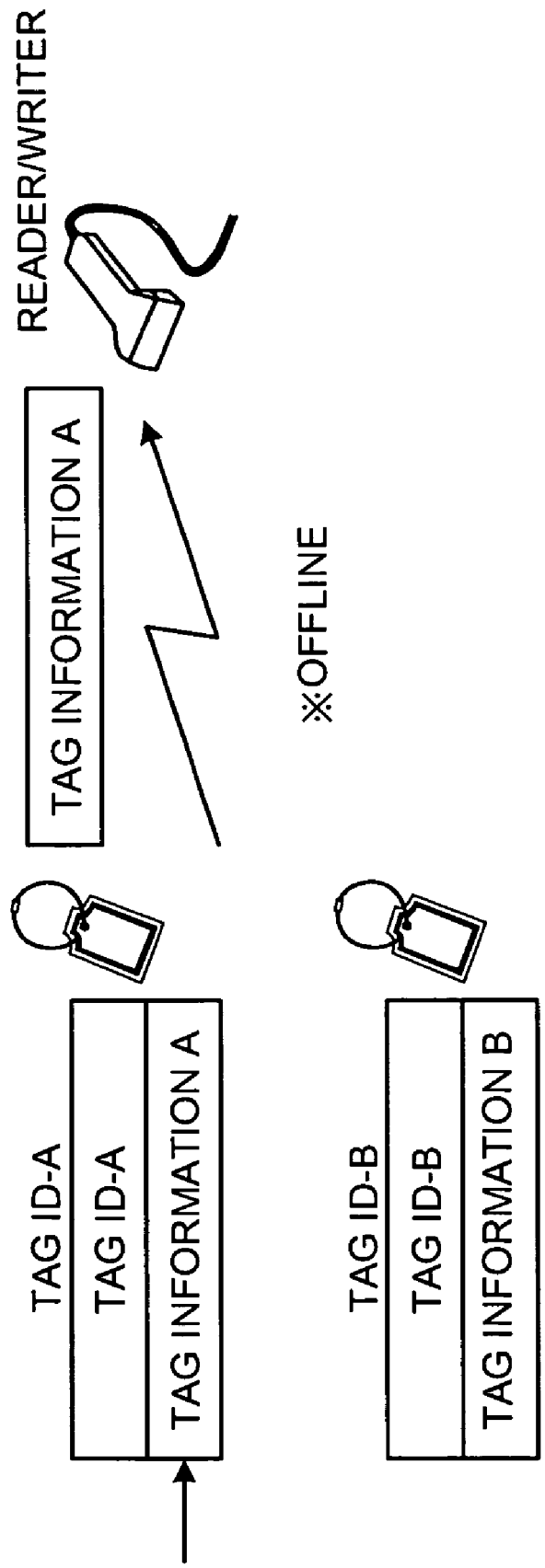
FIG. 10 is a schematic for explaining another example of a conventional art.

FIG. 8 is a detailed functional block diagram of a computer 200 that executes tag-information managing program. The computer 200 includes a random access memory (RAM) 210, a central processing unit (CPU) 220, a hard disk drive (HDD) 230, a local-area-network (LAN) interface 240, an input/output (I/O) interface 250, and a digital versatile disk (DVD) drive 260.

The RAM 210 is a memory for storing a program or an execution-intermediate-result of the program. The CPU is a central processing unit that retrieves the program from the RAM 210 and executes the program. The HDD 230 is a disk device that stores programs and data. The LAN interface 240 is an interface to connect the computer 200 to another computer via LAN. The input-output interface is an interface to connect an inputting unit, such as a mouse or a keyboard, to a displaying unit. The DVD drive 260 is used for reading data from a DVD or writing data into a DVD.

A tag-information managing program 211 to be executed by the computer 200 is stored in a DVD, read from the DVD by the DVD drive 260, and installed into the computer 200.

Alternately, the tag-information managing program 211 can be stored in a database of another computer system connected via the LAN interface 240, so that the tag-information managing program 211 can be retrieved from the database and installed into the computer 200.

After the tag-information managing program 211 is installed in the computer 200, the tag-information managing program 211 is stored in the HDD 230, retrieved by the RAM 210, and executed as a tag-information managing process 221 by the CPU 220.

According to an embodiment of the present invention, the memory area of the RFID tag is effectively used so that a cost per user to use the RFID tag can be effectively reduced.

Furthermore, according to an embodiment of the present invention, the tag information of the RFID tag can be updated with respect to the user of the RFID tag, so that a cost per user to use the RFID tag can be effectively reduced.

Moreover, according to an embodiment of the present invention, even if the access status of the user is offline, the tag information corresponding to the user can be written into the RFID tag, so that the user whose access status is offline can use the RFID tag.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for managing tag information to be stored in a radio-frequency-identification tag, the apparatus comprising:
    a storing unit that stores a plurality of pieces of tag information to be stored in a single radio-frequency-identification tag shared by a plurality of users, a piece of the tag information corresponding to each of the users, part of the piece of the tag information being stored in the single radio-frequency-identification tag; and
    a responding unit that transmits, in response to a request from a reader/writer, first tag information for a first user specified by the reader/writer to the reader/writer, the first tag information being part of a piece of the tag information corresponding the first user, the responding unit transmitting second tag information corresponding to a second user in addition to the first tag information, the second tag information being part of a piece of the tag information corresponding the second user and being specified to be transmitted when the first tag information is transmitted, the second user being specified by the responding unit based on an order in which the users use the radio-frequency-identification tag and information indicating whether a reader/writer of each user can make a request via a network in an environment in which each user uses the radio-frequency-identification tag.

2. The apparatus according to claim 1, wherein
the responding unit specifies the second user further based on a transmission speed of the network, and transmits the second tag information corresponding to the specified second user.

3. A method of managing tag information to be stored in a radio-frequency-identification tag, the method comprising:
    registering a plurality of pieces of tag information to be stored in a single radio-frequency-identification tag as tag management information, the single radio-frequency-identification tag being shared by a plurality of users, a piece of the tag information corresponding to each of the users, part of the piece of the tag information being stored in the single radio-frequency-identification tag; and
    transmitting, in response to a request from a reader/writer, first tag information for a first user specified by the reader/writer to the reader/writer, the first tag information being part of a piece of the tag information corresponding the first user, the transmitting including transmitting second tag information corresponding to a second user in addition to the first tag information, the second tag information being part of a piece of the tag information corresponding the second user and being specified to be transmitted when the first tag information is transmitted, the second user being specified based on an order in which the users use the radio-frequency-identification tag and information indicating whether a reader/writer of each user can make a request via a network in an environment in which each user uses the radio-frequency-identification tag.

4. The method according to claim 3, wherein
the second user is specified further based on a transmission speed of the network.

5. A computer-readable non-transitory recording medium that stores a computer program for managing tag information to be stored in a radio-frequency-identification tag, wherein
the computer program causes a computer to execute:
    registering a plurality of pieces of tag information to be stored in a single radio-frequency-identification tag as tag management information, the single radio-frequency-identification tag being shared by a plurality of users, a piece of the tag information corresponding to each of the users, part of the piece of the tag information being stored in the single radio-frequency-identification tag; and
    transmitting, in response to a request from a reader/writer, first tag information for a first user specified by the reader/writer to the reader/writer, the first tag information being part of a piece of the tag information corresponding the first user, the transmitting including transmitting second tag information corresponding to a second user in addition to the first tag information, the second tag information being part of a piece of the tag information corresponding the second user and being specified to be transmitted when the first tag information is transmitted, the second user being specified based on an order in which the users use the radio-frequency-identification tag and information indicating whether a reader/writer of each user can make a request via a network in an environment in which each user uses the radio-frequency-identification tag.

6. The computer-readable non-transitory recording medium according to claim 5, wherein
the second user is specified further based on a transmission speed of the network.

* * * * *